July 24, 1951 R. ELMS 2,561,790
DATE INDICATOR
Filed June 16, 1949 6 Sheets-Sheet 2
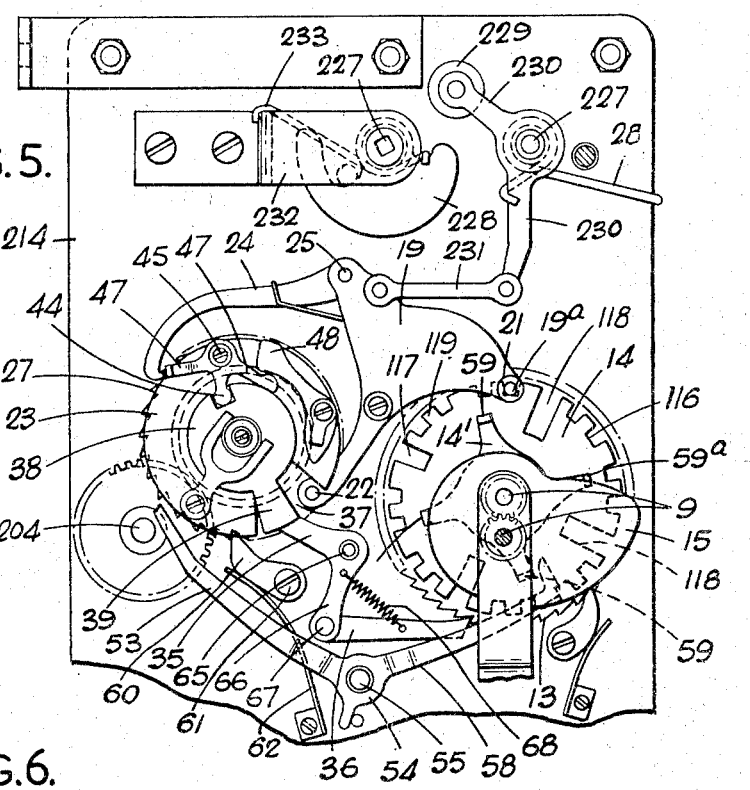
FIG. 5.
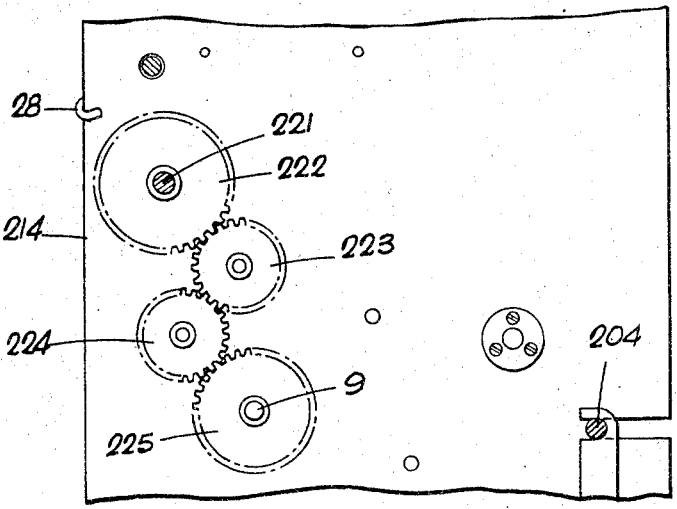
FIG. 6.
INVENTOR
ROBERT ELMS
ATTORNEYS July 24, 1951  R. ELMS  2,561,790
DATE INDICATOR
Filed June 16, 1949  6 Sheets-Sheet 3
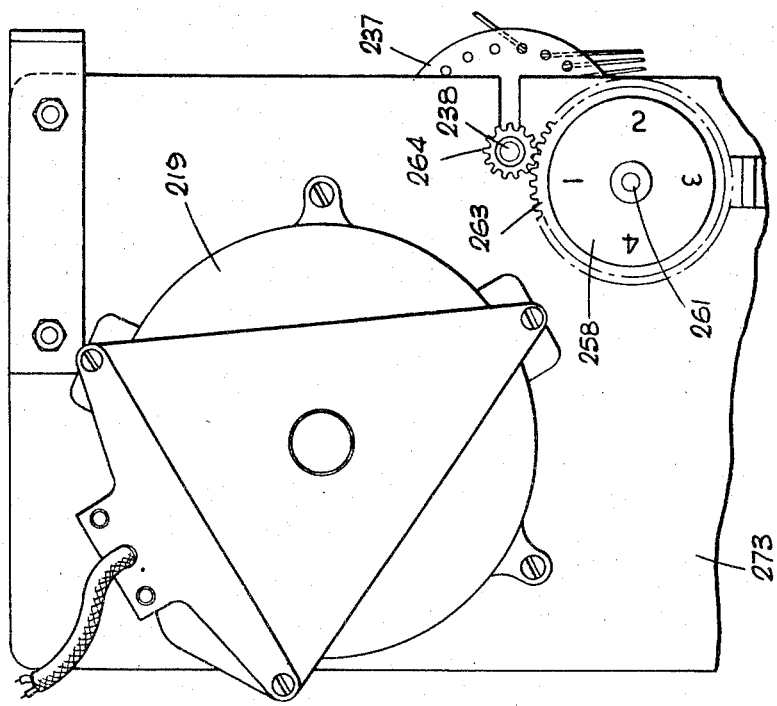
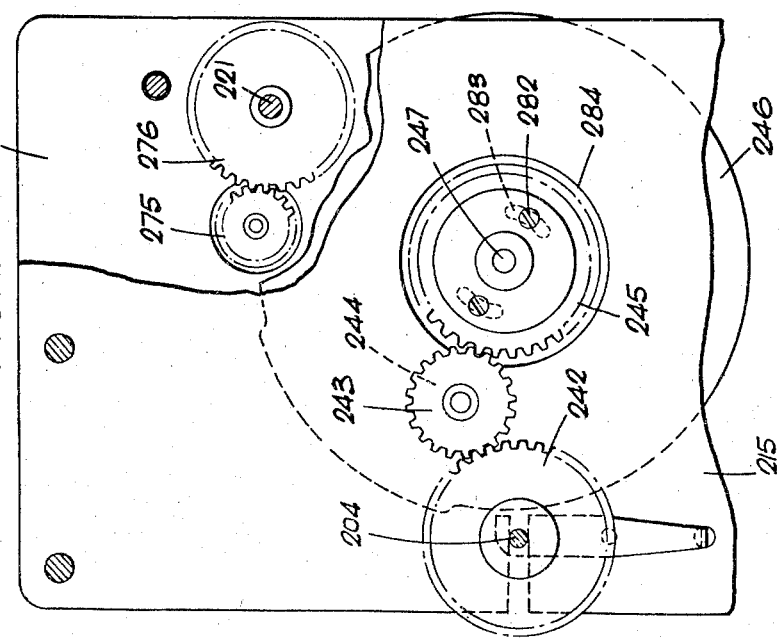
INVENTOR
ROBERT ELMS
ATTORNEYS

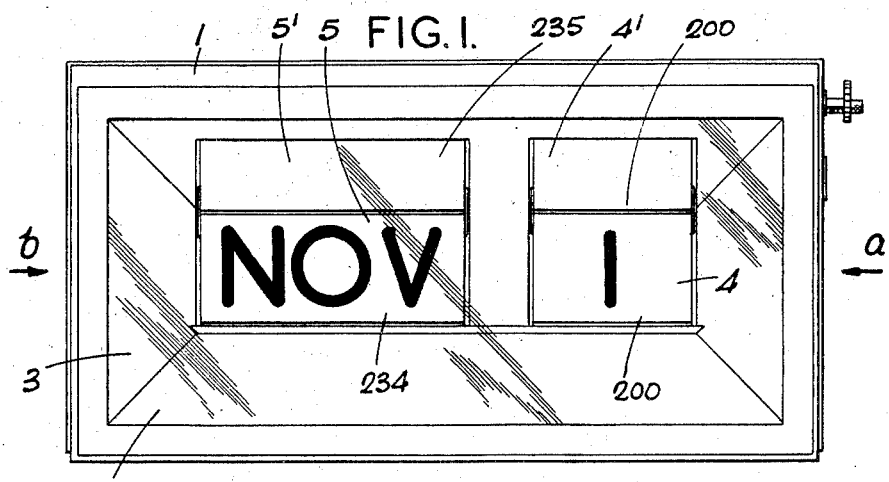
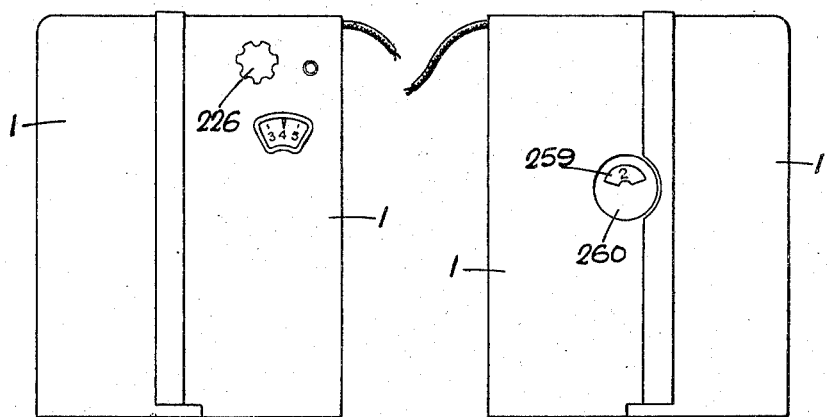
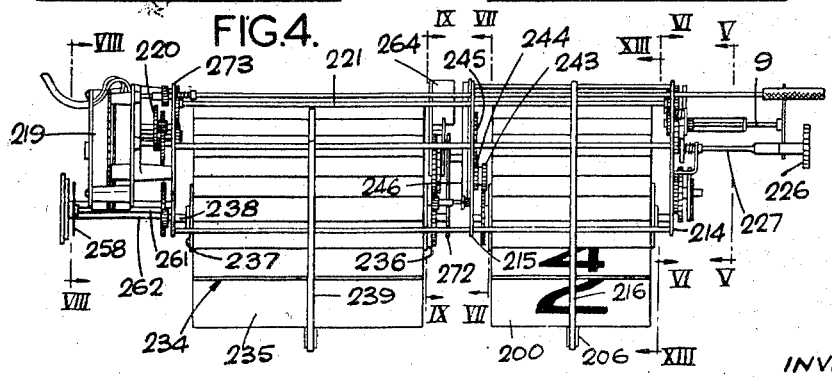

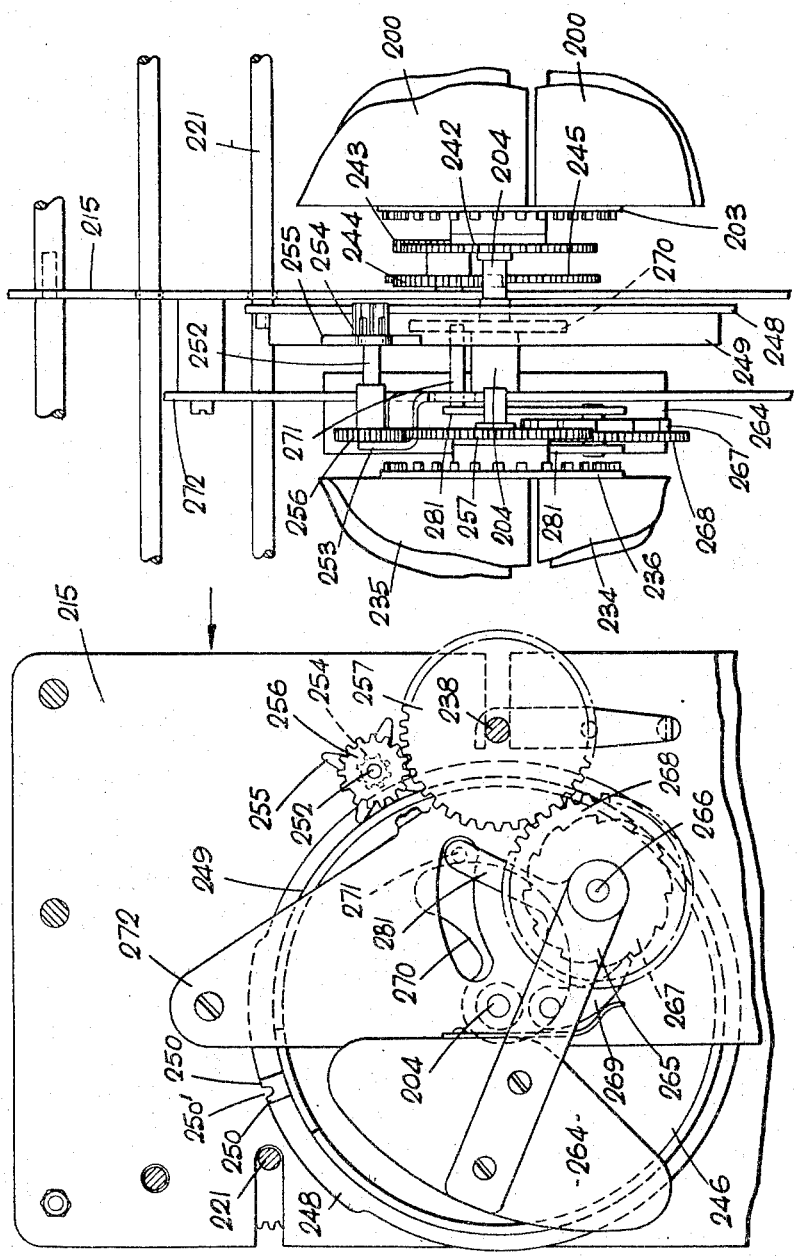

July 24, 1951  R. ELMS  2,561,790
DATE INDICATOR
Filed June 16, 1949  6 Sheets-Sheet 5
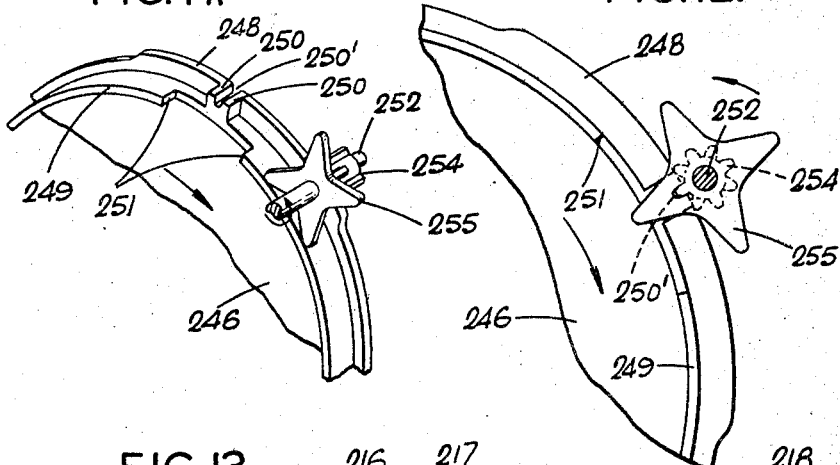
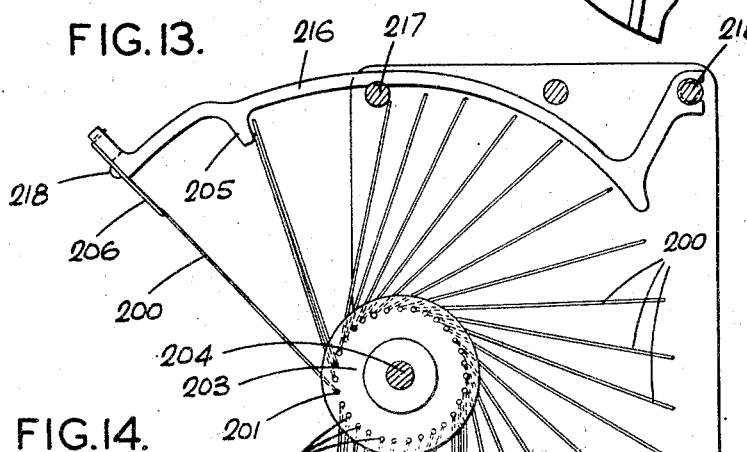
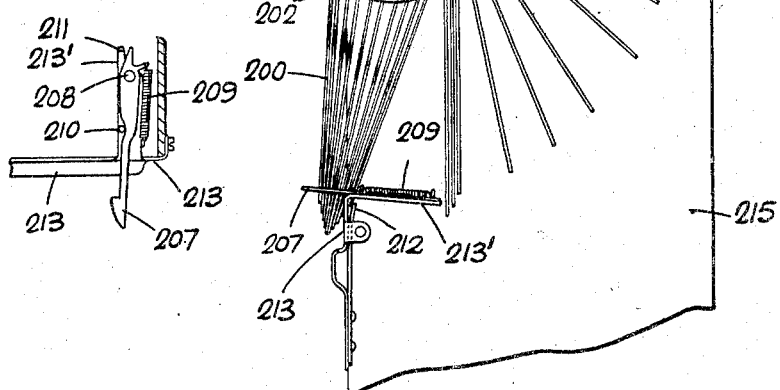
INVENTOR
ROBERT ELMS
BY
ATTORNEYS July 24, 1951  R. ELMS  2,561,790
DATE INDICATOR
Filed June 16, 1949  6 Sheets-Sheet 6
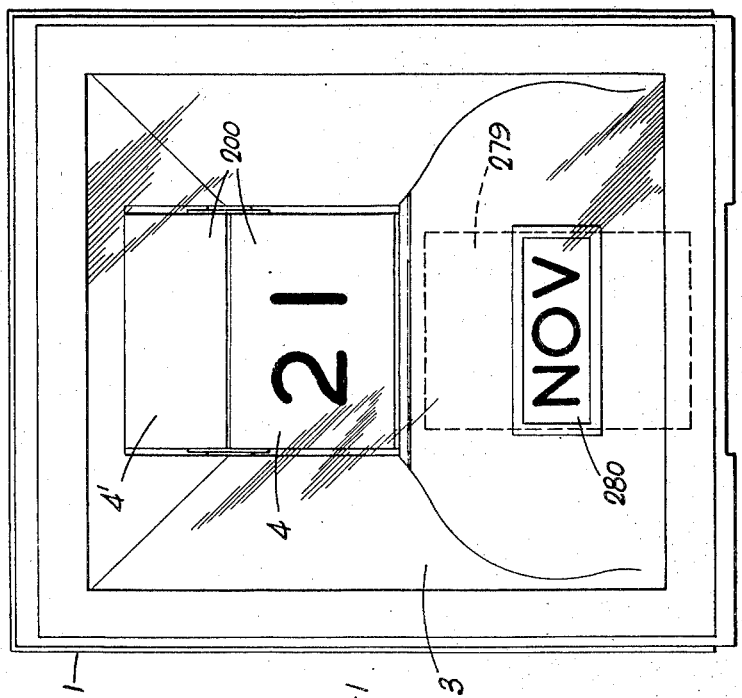
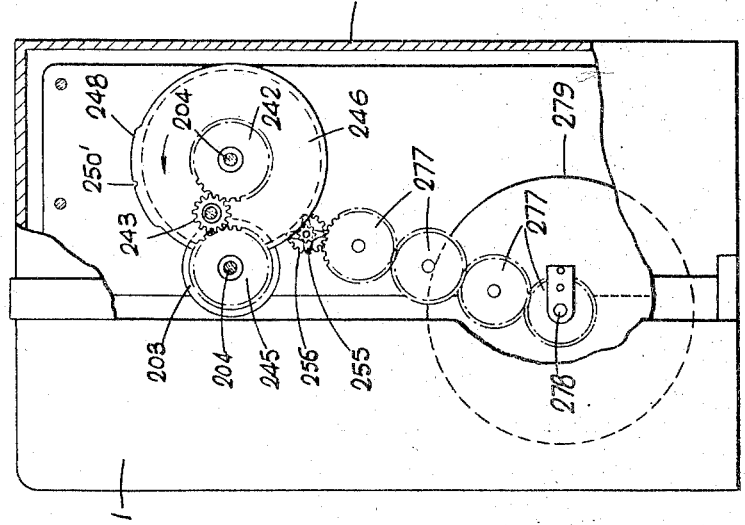
INVENTOR
ROBERT ELMS
BY
ATTORNEYS Patented July 24, 1951

2,561,790

UNITED STATES PATENT OFFICE 2,561,790

DATE INDICATOR

Robert Elms, Cricklewood, England

Application June 16, 1949, Serial No. 99,553
In Great Britain June 14, 1948

4 Claims. (Cl. 40—112)

In the specification of the present inventor's prior Patent No. 2,213,462, September 3, 1940, a date indicator is described which is driven by an electric clock, the day of the month being indicated by a dial in the form of a disc, drums or numeral wheels.

While such a date-figure indicator is efficient for use on a desk or in a small office or other apartment, if it be required to be erected in a large office or hall the numerals indicating the day of the month have to be so large that the dial becomes unduly cumbersome.

One object of the present invention is to substitute an indicator of the multi-plate type for the date-figure indicating dial so that without unduly increasing the size of the complete apparatus, and particularly of the operating mechanism, comparatively large numerals can be used.

Such a substitution, however, was found by experiment to entail considerable difficulties in order to avoid overloading the date indicating mechanism, which difficulties have been overcome by the invention.

Another object is to substitute a plate type indicator for indicating the name of the month, but a drum type indicator may be used for this purpose.

A date indicator according to the invention includes a multi-plate indicator unit consisting of a series of plates each bearing a numeral indicating the day of the month, the plates being radially disposed and pivotally mounted between and on two flanges adjacent to the peripheries thereof, the flanges being carried by a spindle which is rotated intermittently by mechanism so as to change the date display plates at the end of each day.

This mechanism for convenience termed date indicator mechanism is preferably driven by electric clockwork, provision being made by which it can be driven by hand to enable the apparatus to be set.

The date indicator mechanism also changes the indicator at the end of the last day of the month to indicate the first day of the succeeding month irrespective of the number of days in the month.

In the application to a perpetual calendar or date indicator, means are provided to allow for normal years and leap years.

The indicator unit for displaying the name of the month and operated by the clockwork mechanism may be of the drum type but it is preferably of the display plate type and similar to the day display plate indicator.

When a month plate indicator unit is provided, means are also provided to counterbalance the unbalanced weight thereof during the changing period in order to relieve the driving effort on the intermittent operating mechanism. Further, means are provided to reduce the braking effort exerted on the intermittent driving gear during the period when the month plate indicator unit is unbalanced. Also means are provided to give the same display formation and other positioning as in the date figure unit.

In the accompanying drawings a perpetual calendar is illustrated by way of example, having plate type indicators both for the day of the month and the month.

In these drawings:

Figure 1 is a front elevation of the complete apparatus.

Figures 2 and 3 are end elevations as seen in the direction of the arrows $a$ and $b$, Figure 1, respectively.

Figure 4 is a plan with the casing removed.

Figure 5 is an end sectional view on V—V, Figure 4.

Figures 6 and 7 are sectional end elevations on the lines VI—VI, VII—VII, Figure 4, respectively.

Figure 8 is a sectional elevation on VIII—VIII, Figure 4.

Figure 9 is a sectional elevation on IX—IX, Figure 4, and

Figure 10 is a corresponding front elevation.

Figures 11 and 12 are perspective views showing the pair of teeth on the locking disc.

Figure 13 is a sectional elevation on XIII—XIII, Figure 4,

Figure 14 is a detail plan of an indicator latch.

Figures 15 and 16 are respectively a front view and a side sectional view of a date indicator having an indicating drum for the name of the month.

In the example illustrated by Figures 1 to 14 of the drawings a casing 1 is provided with a glazed front 2, a recessed front plate 3 behind the glazed front, the plate 3 having two openings or windows 4 and 5 at which the day of the month and the month are indicated respectively by two indicators of the multiplate type.

The day of the month indicator, i. e. the date-figure indicator, comprises a series of plates 200 each of which is pivoted on pins 201 in holes 202 in flanges 203 which are fixed on a spindle 204, the holes being situated close to the circumferential edges of the flanges, as seen in Figure 13.

Each plate 200 bears a numeral indicating a day of the month, there being thirty-one plates.

As the spindle 204 is rotated intermittently, as hereinafter described, the flanges 203 carry the plates around so that they are first arrested by a stop 205 and then by a stop 206. These stops are so disposed forwardly of the flanges 203 that although two or more plates may be arrested at the stop 205, at each intermittent rotation of the spindle, the foremost plate, previously arrested by the stop 205, is able to pass under it, and move against the stop 206. At the same moment the plate previously arrested by the stop 206 is moved under that stop and falls down into a vertical position to expose its indicating numeral.

In falling it passes a latch 207, Figures 13 and 14, which is pivoted at 208 and is provided with a spring 209. Stop pins 210 and 211 limit the degree of oscillation of the latch.

The pivot pin 208 is carried by a bracket 213' formed on a cross bar 213.

The falling plates accumulate against a spring tongue 212 carried by the cross bar 213, which extends between and is fixed to two frame plates 214 and 215, Figure 4. The spring tongue 212 is preferably arranged at the centre of the cross bar 213.

As the flanges 203 rotate, the plates are drawn successively over the spring tongue 212 and eventually round to the stops 205 and 206.

The stop 205 is conveniently formed on a guard bar 216 removably fixed on stay rods 217 and 218 connecting the frame plates 214 and 215.

The stop 206 is a rectangular plate screwed to the adjacent end of the bar 216 having an elongated hole for its fixing screw 218 so as to allow of adjustment in fixing it.

As each indicator plate is arrested by the stop 206 its plain side coincides with the upper part or gap 4' of the window 4, Figure 1, the plate when released from the stop 206 falling down through this gap into the lower part of the window 4 where it exposes its indicating numeral.

The indicator spindle 204 is rotated intermittently from electric clockwork mechanism so that each operation occurs about midnight, the operation being controlled by date indicator mechanism similar to that described in specification of Patent No. 2,213,462.

In Figure 4, the electric motor and the clockwork are respectively indicated generally by the reference numerals 219 and 220 whereas the reference numerals for the date indicator mechanism in Figures 4 and 5 indicate corresponding parts of the similar mechanism illustrated in the drawings of specification of Patent No. 2,213,462.

In the present instance, however, the shaft 9 is driven from the clockwork by a shaft 221 and a train of gear wheels 222, 223, 224 and 225 the last gear 225 being fixed on the shaft 9. The shaft 221 is driven from the clockwork by gears 275 and 276, Figures 4 and 7. The arrangement is such that the shaft 9 makes one revolution every 24 hours.

Means for operating the three armed lever or rocker 19 by hand, in order to facilitate setting of the mechanism, are shown, comprising a handle 226 Figure 4, on a shaft 227 Figures 4 and 5 provided with a snail cam 228 for engagement with a roller 229 on one arm of a bell-crank lever 230, the other arm of which is connected by a link 231 to the rocker 19. The shaft 227 is pivoted in the frame plate 214 and a bracket 232 Figures 4 and 5 fixed thereto. A coiled spring 233, Figure 5, normally holds the shaft 227 with its cam 228 away from the path of the roller 229.

A coiled spring 28 is substituted for the spring 28 of the rocker 19 described in specification of Patent No. 2,213,462.

The date indicator mechanism comprises a notched disc 14 and a gap disc 23 having respectively ratchet wheels 13 and 27. The ratchet wheel 27 is rotated intermittently by a pawl 24 pivoted at 25 on the rocker 19, and the ratchet wheel 13 is rotated intermittently by a pawl 36 pivoted at 67 on a bell-crank lever 35 oscillating on a pin 65, and provided with a spring 68. The rocker 19 is moved in one direction by a snail cam 15 on the shaft 9, the cam engaging with a roller 21 on the pin 19a, and in the opposite direction, to drive the ratchet wheel 27, by the coiled spring 28. The arm 66, of the bell-crank lever 35 which carries the driving pawl 36 for the ratchet wheel 13, is moved in both directions by a pin on the ratchet wheel 27 engaging with the hooked end of the bell-crank lever 35 as described in specification of Patent No. 2,213,462, the pin and hooked end being indicated respectively as 33 and 34 in Figure 11 of the drawings of that specification.

The ratchet wheel 27 has 31 teeth and is advanced one tooth each day.

A pawl 60 pivotally mounted on a pin 61 on the frame is urged by a spring 62 into engagement with the ratchet wheel 27 for the purpose of retaining it against the unbalanced load of the multi-plate day of the month indicator.

The stroke of the rocker 19 is normally limited by contact of a pin 22 on this member with the periphery of the gap disc 23, the disc being secured to the ratchet wheel 27. The gap disc 23 is provided with a gap 37, the effective extent of which is normally limited by a mask 39 attached to a disc 38 rotating with the disc 23.

As explained in specification of Patent 2,213,-462 on the 30th day of a month other than February, the gap 37 in the disc 23 is opposite to the pin 22 on the rocker 19. If the month has thirty-one days the rocker can still make only its normal movement, since the pin 19a concentric with the roller 21 engages with one of the teeth 119 of a disc 14 freely mounted on the shaft 9. If the month has thirty days, one of the notches 116 in the disc 14 is beneath the pin 19a and the rocker 19 can thus follow the snail cam 15 under the pressure of the spring 28 until the pin rests on the bottom of the notch. The ratchet wheel 27 is thus moved through two steps and the date indication changed from "30" to "1." At the next actuation, the disc 23 secured to the ratchet wheel 27 is advanced after one step of movement to a position in which its periphery lies beneath the pin 22 and this and the following movements of the rocker 19 and the wheel 27 are limited to one step, notwithstanding that a notch 116 is still beneath the pin 19a. The disc 14 is advanced through one step during the middle of each month by the pawl 36, carried by the bell crank lever 35 which is actuated by a pin (33) on the ratchet wheel 27. The disc 14 is divided into forty-eight parts and rotates once in four years, leap years thus being provided for. When the disc 14 is stepped into its normal February position, a deep notch 118 comes beneath the pin 19a. At the same time a pin or projection 59 on a four armed member 14' rotating with the disc 14 strikes one arm 58 of a lever 54 and rocks this lever about the pivot 55 so that the other arm 53 of the lever rocks a three-armed lever 45 pivoted on the gap disc 23. One arm 44 of the lever 45 engages with the disc 38 carrying the mask 39, the disc 38 thus being moved relatively to the disc 23 to increase the extent of the gap 37. Thus, the gap 37 comes under the pin 22 on the 28th of the month, and since the deep notch 118 is beneath the pin 19a at the same time, the rocker 19 makes a sufficiently long movement to advance the ratchet wheel 27 by four steps, the date indicator then being changed from "28" to "1."

In February of leap year, a notch 117, not so deep as the notch 118, comes beneath the pin 19a. The lever 54 is rocked in leap year by a pin or projection 59a so arranged that the gap 37 is increased by a less extent than during a normal February, whereby the single step movement continues until the 29th day, whereupon the pin 22 moves into the gap 37 and the notch 117 permits a three-step movement of the rocker 19.

The gap is always reduced to its normal size during March by the pin 22 acting on a lever 48 pivoted on the gap disc 23 and engaging with the arm 47 of the lever 45.

The month name indicator is of the multi-plate type and of similar construction to the date figure indicator before described, except that the plates 234 which bear the names of the month, alternate with blank plates 235, which are used to approximate the number of plates used in the date figure indicator and give a similar resting angle as they support each other during rotation and to present the same general formation in the display positions, each blank plate 235 covering the gap 5' of the window 5 as corresponding plate 234 in front of it falls into position in the window.

The plates 234, 235 are pivotally mounted on and between two flanges 236, 237 adjacent to the circumferential edges thereof, the flanges being fixed on a spindle 238. A guard bar 239, having two stops, and a spring controlled latch are provided of similar form to those provided for the day indicator.

The spindle 238 is rotated from the spindle 204 of the day indicator by the mechanism now to be described, so that it is changed at the end of each month.

A train of gears 242, 243, 244 and 245 drives a disc 246 which is mounted to rotate on a stud 247. The stud is fixedly supported by the frame plate 272, and the disc is clamped between a snail cam 270 and the gear 245 by screws 282, the disc 246 having slots 283, so as to allow for adjustment. A hole 284 in the frame plate 215 provides the necessary clearance for the rotation of this clamping device.

The disc 246 has an arcuate flange or track 248 and a rim or track 249.

A pair of axially projecting gear teeth 250 is provided on the flange 248, with a recess 250' between the teeth. A gap 251 is formed in the rim 249 opposite to the teeth 250.

A mutilated pinion 254 is mounted on a short shaft 252 which is pivoted at one end in the frame plate 215 and at the other end in a bracket 253 fixed on the next frame plate 272.

Alternate teeth of the pinion 254 are cut away for a part of their length, for instance there are actually only four teeth on the right hand part of the pinion, as seen in Figures 10 and 11, in the path of the arcuate flange or track 248, and eight normal teeth on the left hand part in the path of the pair of teeth 250.

The normal teeth are intended to mesh intermittently with the pair of teeth 250. Two teeth of the mutilated part engage with the flange or track 248 just before and after the pinion meshes with the pair of teeth 250 so that the pinion is locked against rotation.

The pinion 254 also has four teeth or radial arms 255 of greater radial length. These are intended for locking engagement with the rim 249 when the pinion 254 is stationary. The gap 251 allows the longer teeth or arms 255 to rotate when the pinion 254 is rotating.

The reason for the provision of these two locking arrangements is that the month indicator unit is unbalanced and provision is made, as explained hereinafter, to balance the indicator unit immediately before, during and immediately after the rotation of the pinion 254, during which brief period the short locking track or flange 248 is passing the pinion. When the indicator unit is unbalanced, that is, during the very much longer period taken by the remainder of the rotation of the disc 246, the lighter frictional contact of the longer teeth or arms 255 on the track or rim 249 is available.

Normally a pair of the long arms or teeth 255 slide in contact with the rim 249 so that the shaft 252 is locked against rotation with very little braking effort from the unbalanced unit. Towards the end of the month the pair of teeth 250 and the gap 251 approach the mutilated pinion 254 and at the end of the last day of the month the pair of teeth 250 engage with the pinion 254 and as the arms 255 are free to rotate in the gap 251 the shaft 252 is rotated one step. Motion is thus transmitted by gear wheels 256 and 257 to the spindle 238, Figure 9, to cause the blank plate 235, held by the forward stop on the guide bar 239, and the name plate 234 held by the rear stop on the bar, to fall down so that the name of the next month is exhibited at the window 5, Figure 1, a succeeding blank plate 235 being held by the forward stop and a succeeding name plate 234 and blank plate 235 being held by the rear stop. The name plates 234 and blank plates 235 are both changed together at each operational movement of the spindle 238, whereas the date figure plates only move one at a time, this is facilitated by spindle 238 having a $\frac{1}{12}$ of a revolution movement, whereas the spindle 204 has a $1/31$ of a revolution movement.

In order to relieve the gearing of the unbalanced load of the day of the month indicator during its periodic operation, a counterbalance weight 264, Figures 4, 9 and 10 is provided. The weight is carried by a lever 265 which is pivotally mounted on a stud 266. A ratchet wheel 267 and a gear wheel 268 fixed to it are freely mounted on the stud 266. The gear wheel 268 meshes with the gear wheel 257 before referred to. The lever 265 has a spring actuated pawl 269 which engages with the ratchet wheel 267, so that the weight 264 tends to rotate the wheel 268 and therefore assist in the rotation of the wheel 257 during each operation of the month indicator. It is normally inoperative whilst being lifted together with the pawl to the next ratchet tooth by a snail cam 270 which engages with a pin 271 on an arm 281 of the lever 265. The snail cam 270 is secured to the disc 246, hereinbefore referred to, and is arranged to release the pin 271 ready for the period when the pair of teeth 250 commence operating. The weight 264 then falls and thrusts the pawl 269 into driving engagement with the ratchet wheel 267. It will be appreciated that the locking track 248 for the mutilated teeth of the pinion is available during the period that the month indicator unit is counterbalanced and that the locking track or rim for the longer teeth 255 is available during the period that the month indicator unit is not counterbalanced.

A leap year indicator is provided. It comprises a disc 258, Figures 4 and 8, bearing numerals 1, 2, 3, 4, indicating the respective year at a window 259 in a disc 260, Figure 3, at the left hand end of the casing 1. The disc 258 is mounted on a spindle 261 pivoted in a bracket 262 and in the frame plate 273, the spindle having a gear wheel 263 driven by a pinion 264 on the spindle 238.

The ratio of the gears 264 and 263 is 1 to 4, so that for each complete rotation of the name of the month indicator spindle 238, i. e. each year, the indicator disc 258 makes a quarter turn.

The electric motor 219 is of the synchronous alternating current type and may be such as described in specification of the present inventor's prior Patent No. 2,227,894, January 7, 1941, the clockwork driven by the motor being similar to that described in specification of Patent No. 2,213,462.

Although it is preferred to provide a multi-plate indicator for displaying the name of the month as above described, a drum type of indicator may be used for that purpose, for instance as indicated in Figures 15 and 16. In this example the day of the month indicator is of the multi-plate type displaying the day on plates 200 at a window 4, as in the first example described.

The shaft 204 of this indicator drives the shaft 278 of a drum 279 bearing the names of the month on its periphery for display at a window 280.

The drive is effected by similar means to that adopted for driving the month indicator of the first example, the corresponding parts shown in Figure 16 being indicated by similar reference numerals. As the day of the month indicator unit is arranged above the month indicator unit, the gear wheel 256 drives the shaft 278 through a train of gears 277.

As the drum 279 is balanced there is no necessity to provide a balance weight as in the first example.

The invention is not confined to the use of the particular mechanism described for intermittently driving the date figure plate display unit as any other equivalent means may be adopted.

I claim:

1. A date indicator having a day of the month indicator of the multi-plate type and comprising thirty-one plates each bearing a numeral representing a day of the month, a shaft, flanges fixed on said shaft, said plates being pivotally mounted in equally spaced relation on and between said flanges, an upper adjustable stop for the purpose of successively releasing and synchronising the release of said plates, a lower resilient stop for arresting and retaining the released plates in display position, means for imparting a unidirectional rotational movement to said shaft including a ratchet wheel having thirty-one teeth, a driving pawl for co-operation with said teeth, means for reciprocating said driving pawl including a clockwork mechanism to effect a reciprocation once every twenty-four hours, a spring loaded detent for engagement with said ratchet wheel for the purpose of retaining it with the indicator plates in display position against the unbalanced load of said plates, and means for varying the amplitude of reciprocation of said driving pawl on the 28th, 29th and 30th operation to suit the days of the month, said amplitude varying means being of the character referred to including a rocker carrying said driving pawl, a variable gap disc, a notched disc and a driving snail driven by said clockwork mechanism.

2. A date indicator as specified in claim 1 provided with a month-name indicator of the multi-plate type, comprising a series of alternate blank plates and plates bearing the names of the months, a shaft provided with flanges between and on which said plates are pivotally mounted and stops for successively arresting and releasing said plates for the purpose of display positioning and synchronising thereof, and driving gear between the shaft of the day of the month indicator and the shaft of the month-name indicator including a driving disc on the former shaft provided with two locking tracks one having a pair of teeth, and the other having a gap opposite to said pair of teeth, and a mutilated toothed pinion having normal teeth for intermittent driving engagement with the pair of teeth, mutilated teeth for locking engagement with one of said tracks and longer teeth for locking engagement with the other of said tracks for the purpose of enabling the shaft of the month-name indicator to be partially rotated at the end of each month when the driving disc has been rotated to bring the pair of teeth and the gap into register respectively with the normal and longer teeth of the pinion—the longer locking teeth reducing the braking effort on the driving disc due to the unbalanced weight of multi-plate unit.

3. A date indicator as specified in claim 1, provided with a month-name indicator of the multi-plate type, comprising a series of alternate blank plates and plates bearing the names of the months, a shaft provided with flanges between and on which said plates are pivotally mounted and stops for successively arresting and releasing and display positioning and synchronising said plates, and driving gear between the shaft of the day of the month indicator and the shaft of the month-name indicator including a driving disc on the former shaft provided with two locking tracks one having a pair of teeth, and the other having a gap opposite to said pair of teeth, and a mutilated toothed pinion having normal teeth for intermittent driving engagement with the pair of teeth, mutilated teeth for locking engagement with one of said tracks and longer teeth for locking engagement with the other of said tracks for the purpose of enabling the shaft of the month-name indicator to be partially rotated at the end of each month when the driving disc has been rotated to bring the pair of teeth and the gap into register respectively with the normal and longer teeth of the pinion, the longer locking teeth reducing the braking effort on the driving disc due to the unbalanced weight of multi-plate unit, and means for counterbalancing said month-name indicator during the partial rotation of its shaft for the purpose of relieving the driving effort on the aforesaid driving gear, comprising a ratchet wheel in geared connection with said driving gear a freely mounted counter-balance weighted lever having a driving pawl engaging with said ratchet wheel and also having an arm provided with a pin, a snail cam on the aforesaid driving disc for engaging with said pin for the purpose of raising said weighted lever and driving pawl to the next operative position on the ratchet wheel.

4. A date indicator as specified in claim 1 including means for actuating the rocker by hand to facilitate the setting of the day of the month indicator independently of the clockwork mechanism, said means comprising a shaft having a handle thereon, a snail cam fixed on said shaft, a spring for holding said shaft with said snail cam in an inoperative position, a lever having a roller for engagement by said snail cam and a link connecting said lever to the rocker.

ROBERT ELMS.

REFERENCES CITED

The following references are of record in the file of this patent:

UNITED STATES PATENTS

| Number | Name | Date |
|---|---|---|
| 2,096,248 | Huston | Oct. 19, 1937 |
| 2,257,947 | Goldwait | Oct. 7, 1941 |
| 2,343,969 | Forbes | Mar. 14, 1944 |
| 2,470,692 | Farr | May 17, 1949 |

FOREIGN PATENTS

| Number | Country | Date |
|---|---|---|
| 405,824 | Great Britain | Feb. 14, 1934 |